(12) United States Patent
Okumura et al.

(10) Patent No.: US 10,252,214 B2
(45) Date of Patent: Apr. 9, 2019

(54) CARBON DIOXIDE SEPARATION AND RECOVERY SYSTEM AND METHOD

(71) Applicant: KAWASAKI JUKOGYO KABUSHIKI KAISHA, Kobe-shi, Hyogo (JP)

(72) Inventors: Takeshi Okumura, Kakogawa (JP); Yoshiharu Nonaka, Kobe (JP); Tomoyuki Ogino, Kobe (JP); Shohei Nishibe, Akashi (JP); Takatoshi Shoji, Kobe (JP); Tatsuya Watanabe, Tokyo (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 509 days.

(21) Appl. No.: 14/901,336

(22) PCT Filed: Jun. 16, 2014

(86) PCT No.: PCT/JP2014/003211
§ 371 (c)(1),
(2) Date: Dec. 28, 2015

(87) PCT Pub. No.: WO2014/208038
PCT Pub. Date: Dec. 31, 2014

(65) Prior Publication Data
US 2016/0136565 A1 May 19, 2016

(30) Foreign Application Priority Data
Jun. 25, 2013 (JP) .................. 2013-133045

(51) Int. Cl.
*B01D 53/02* (2006.01)
*B01D 53/08* (2006.01)
*B01D 53/04* (2006.01)
*C01B 32/50* (2017.01)

(52) U.S. Cl.
CPC ......... *B01D 53/08* (2013.01); *B01D 53/0462* (2013.01); *C01B 32/50* (2017.08);
(Continued)

(58) Field of Classification Search
CPC ........ B01D 2253/102; B01D 2253/104; B01D 2253/108; B01D 2253/1124;
(Continued)

(56) References Cited

U.S. PATENT DOCUMENTS

| 9,073,004 B2* | 7/2015 | Ogino ................ B01D 53/08 |
| 2005/0268481 A1* | 12/2005 | Wiedl ................ B01D 53/261 34/416 |

(Continued)

FOREIGN PATENT DOCUMENTS

| CN | 101772685 A | 7/2010 |
| JP | S53-12778 A | 2/1978 |

(Continued)

OTHER PUBLICATIONS

Jun. 3, 2016 Office Action issued in Chinese Patent Application No. 201480030921.0.
(Continued)

*Primary Examiner* — Christopher P Jones
(74) *Attorney, Agent, or Firm* — Oliff PLC

(57) ABSTRACT

A carbon dioxide separation and recovery system includes: an adsorption reactor, which adsorbs, by an adsorbent, carbon dioxide contained in a to-be-treated gas, discharges the to-be-treated gas from which the carbon dioxide has been removed, and discharges the adsorbent that has adsorbed the carbon dioxide; a desorption reactor, which receives the adsorbent discharged from the adsorption reactor, condenses desorbing steam on the adsorbent to cause carbon dioxide to desorb from the adsorbent, and then discharges the adsorbent; and an adsorbent dryer, which
(Continued)

receives the adsorbent discharged from the desorption reactor, dries the adsorbent until a water content ratio thereof becomes a predetermined value greater than or equal to a water content ratio limit by causing, with use of a drying gas, condensation water contained in the adsorbent to evaporate as steam, and then discharges the adsorbent.

20 Claims, 9 Drawing Sheets

(52) U.S. Cl.
CPC .. *B01D 2253/102* (2013.01); *B01D 2253/104* (2013.01); *B01D 2253/108* (2013.01); *B01D 2253/1124* (2013.01); *B01D 2257/504* (2013.01); *B01D 2258/0283* (2013.01); *B01D 2259/4009* (2013.01); *Y02C 10/04* (2013.01); *Y02C 10/06* (2013.01); *Y02C 10/08* (2013.01); *Y02P 20/152* (2015.11)

(58) Field of Classification Search
CPC ...... B01D 2257/504; B01D 2258/0283; B01D 2259/4009; B01D 53/0462; B01D 53/08; C01B 32/50; Y02C 10/04; Y02C 10/06; Y02C 10/08; Y02P 20/152
See application file for complete search history.

(56) References Cited

U.S. PATENT DOCUMENTS

| | | | | |
|---|---|---|---|---|
| 2008/0138265 | A1* | 6/2008 | Lackner | B01D 53/62 423/224 |
| 2011/0296872 | A1* | 12/2011 | Eisenberger | B01D 53/04 62/640 |
| 2012/0125194 | A1* | 5/2012 | Caram | B01D 53/04 95/41 |
| 2012/0204718 | A1* | 8/2012 | Dinnage | B01D 53/06 95/91 |
| 2012/0325088 | A1* | 12/2012 | Hornbostel | B01D 53/10 95/107 |
| 2014/0096684 | A1* | 4/2014 | Ogino | B01D 53/025 96/242 |

FOREIGN PATENT DOCUMENTS

| | | |
|---|---|---|
| JP | S61-254220 A | 11/1986 |
| JP | 2012-115826 A | 6/2012 |
| JP | 2012-520766 A | 9/2012 |
| JP | 2013-121562 A | 6/2013 |
| WO | 2013/084394 A1 | 6/2013 |

OTHER PUBLICATIONS

Norikyo, I. et al., "Application of the Circulating Moving Bed Process for CO2 Recovery from the Flue Gas of Coal-Thermal Power Plants," Kagaku Kogaku Ronbunshu, (2002), vol. 28, No. 5, pp. 636-640.

Aug. 12, 2014 International Search Report issued in International Patent Application No. PCT/JP2014/003211.

Dec. 29, 2015 International Preliminary Report on Patentability issued in International Patent Application No. PCT/JP2014/003211.

Feb. 13, 2017 Office Action issued in Chinese Patent Application No. 201480030921.0.

* cited by examiner

CARBON DIOXIDE SEPARATION AND RECOVERY SYSTEM AND METHOD

TECHNICAL FIELD

The present invention relates to a technique for separating and recovering carbon dioxide ($CO_2$) from a to-be-treated gas containing the carbon dioxide, such as a coal flue gas. The present invention particularly relates to a carbon dioxide separation and recovery system and a carbon dioxide separation and recovery method, which are capable of selectively separating $CO_2$ from a to-be-treated gas by using a solid adsorbing agent, recovering the separated $CO_2$, and regenerating the solid adsorbing agent utilized for the $CO_2$ separation.

BACKGROUND ART

Conventionally, techniques for recovering $CO_2$ from a $CO_2$-containing exhaust gas, such as a coal flue gas, have been studied (see Patent Literature 1 and Non-Patent Literature 1, for example). Non-Patent Literature 1 describes a $CO_2$ recovery plant adopting a physical adsorption technique and a circulating moving bed regeneration process. The $CO_2$ recovery plant uses a solid adsorbing agent to selectively separate $CO_2$ from a coal flue gas, and recovers the separated $CO_2$.

FIG. 9 shows a schematic configuration of the $CO_2$ recovery plant shown in FIG. 1 of Non-Patent Literature 1. The $CO_2$ recovery plant includes: a cooling tower, an adsorption reactor, a concentration tower, a desorption reactor, and a storage tank, which are vertically arranged in series; and a bucket elevator, which carries the adsorbing agent from the storage tank to the cooling tower. The adsorption reactor, the cooling tower, the desorption reactor, and the storage tank are each packed with zeolite serving as the adsorbing agent. The adsorbing agent sequentially moves from the uppermost cooling tower to the lowermost storage tank, and is carried from the lowermost storage tank to the uppermost cooling tower by the bucket elevator. These chambers and the tank are provided with valves at their lower parts. By opening and closing these valves, a plurality of batches of the adsorbing agent are moved one by one to a lower chamber or tank.

In the $CO_2$ recovery plant with the above configuration, in a pretreatment process using a cooling device and a dehumidifier, water is removed from the coal flue gas by an exhaust gas blower. Then, the coal flue gas is continuously introduced into a lower part of the adsorption reactor. $CO_2$ in the exhaust (flue) gas is adsorbed by the adsorbing agent as moving upward within the adsorption reactor, and the resulting off gas from which $CO_2$ has been removed is discharged to the outside of the system from the top of the adsorption reactor. In the concentration tower, from the adsorbing agent that has adsorbed $CO_2$, part of the $CO_2$ is recovered and compressed together with nitrogen and the like adsorbed by the adsorbing agent. The compressed gas is discharged from the concentration tower, and recovered as a product gas. In the desorption reactor, by feeding of heating steam and decompression, $CO_2$ is caused to desorb from the adsorbing agent. The $CO_2$ that has desorbed is recovered as a product gas. The adsorbing agent thus regenerated is sent to the cooling tower through the storage tank and the bucket elevator. After the adsorbing agent is cooled down, the adsorbing agent is returned to the adsorption reactor and reused.

CITATION LIST

Patent Literature

PTL 1: Japanese National Phase PCT Laid-Open Publication No. 2012-520766

Non-Patent Literature

NPL 1: KOGAKU KOGAKU RONBUNSHU, Vol. 28 (2002) No. 5, "Application of the Circulating Moving Bed Process for $CO_2$ Recovery from the Flue Gas of Coal-Thermal Power Plants", page 636, from the fourth line from the bottom of the left column to line 22 in the right column, Itsuo Norikyo, Hiroshi Okishi, 2002.

SUMMARY OF INVENTION

Technical Problem

The desorption reactor of the $CO_2$ recovery plant described in Non-Patent Literature 1 adopts a contact heat transfer process utilizing a shell-and-tube structure. Specifically, the adsorbing agent is introduced into the shell side of the desorption reactor, and heating steam is introduced into the tube side of the desorption reactor. In this manner, the temperature of the adsorbing agent is increased by indirect heating. However, sensible heat obtained from the heating steam is small. Also, latent heat of the steam flowing out of the desorption reactor is discarded without being utilized. The higher the temperature of zeolite serving as the adsorbing agent, the less the amount of $CO_2$ adsorbed by the zeolite. However, after the adsorbing agent is regenerated, the temperature of the adsorbing agent is high (e.g., 140° C.). Accordingly, it is necessary to cool down the adsorbing agent to a predetermined adsorption temperature (e.g., 40° C.) to recover the adsorption capacity of the adsorbing agent. Therefore, the storage tank and the cooling tower for cooling down the adsorbing agent need to be positioned downstream of the desorption reactor. As thus described, there is still room for improvement in terms of energy saving of conventional $CO_2$ recovery plants. In order to put the $CO_2$ recovery technique in practical use, it is desirable to further reduce energy that is fed for the $CO_2$ recovery.

The present invention has been made in view of the above. An object of the present invention is to realize further reduction of energy that is fed for $CO_2$ recovery and adsorbent regeneration in a carbon dioxide separation and recovery system that uses an adsorbent including a solid adsorbing agent to selectively separate $CO_2$ contained in an exhaust gas and recover the $CO_2$.

Solution to Problem

In the development of a carbon dioxide separation and recovery system, for $CO_2$ desorption from an adsorbent, inventors of the present invention adopted not indirect heating of the adsorbent but direct heating of the adsorbent, in which the adsorbent and steam are brought into direct contact with each other. By adopting the direct heating of the adsorbent, latent heat of the steam can be utilized as energy in the $CO_2$ desorption. Under the condition that the amount of water in the steam is the same, the amount of latent heat energy of the steam is greater than the amount of sensible heat energy of the steam. Therefore, by utilizing the latent heat of the steam, the amount of water necessary for causing $CO_2$ to desorb from the adsorbent can be reduced. Moreover, since the steam is not discharged from the desorption reactor unlike the conventional art in which the steam energy is discarded without being utilized, steam energy loss can be suppressed. Furthermore, the concentration tower for increasing the $CO_2$ concentration is unnecessary, which makes it possible to reduce the equipment cost.

In a case where a carbon dioxide separation and recovery system includes a desorption reactor in which an adsorbent and steam are brought into direct contact with each other as described above, since condensation water is adhered to the adsorbent when the adsorbent is discharged from the desorption reactor, it is necessary that an adsorbent dryer be disposed downstream of the desorption reactor in order to evaporate the condensation water. A conventional ordinary adsorbent dryer is configured to dry a material by blowing dry air against the material. In the case of adopting such an ordinary adsorbent dryer in the carbon dioxide separation and recovery system, when the adsorbent is discharged from the adsorbent dryer, the temperature of the adsorbent has increased due to the drying. Therefore, it is necessary that the cooling tower be disposed downstream of the adsorbent dryer in order to cool down the adsorbent to a suitable adsorption temperature for the $CO_2$ adsorption in the adsorption reactor.

There are known fundamental facts regarding drying as described below. As shown in a graph of FIG. 10, which indicates temporal changes in an average water content ratio and a material temperature, when a sufficiently humidified material is dried under a steady condition, there are three periods, i.e., a material preheating period I, a constant drying period II, and a decreasing rate drying period III. In the constant drying period II, evaporation from the free water surface occurs, and thereby the amount of water in the material decreases. In the constant drying period II, all the amount of heat flowing into the material is consumed in the water evaporation. Consequently, the temperature of the material stays substantially constant, and in the case of hot-air drying, the temperature of the material is the same as the wet-bulb temperature of hot air that contacts the material. In the decreasing rate drying period III, water evaporation within the material and water transfer to the material surface occur, and the decrease in the amount of water in the material becomes gradual. In the decreasing rate drying period III, the temperature of the material increases, and uneven temperature distribution occurs within the material.

Based on the above-described fundamental facts regarding drying, the inventors have obtained the following findings. In the adsorbent dryer, the adsorbent is hot-air-dried by a drying gas of a predetermined temperature, and the drying is ended before the drying of the adsorbent enters the decreasing rate drying period III, i.e., the drying is ended when the water content ratio of the adsorbent is greater than or equal to a water content ratio limit $w_c$. By adopting this manner of drying, the adsorbent can be cooled down to a suitable adsorption temperature for the $CO_2$ adsorption, or the adsorbent can be cooled down such that the temperature of the adsorbent is brought close to the suitable adsorption temperature. That is, the cooling tower downstream of the adsorbent dryer is unnecessary, and since the adsorbent discharged from the adsorbent dryer can be directly carried into the adsorption reactor, the storage tank is unnecessary. Based on the findings thus described, the inventors have conceived of the present invention.

A carbon dioxide separation and recovery system according to one aspect of the present invention is a carbon dioxide separation and recovery system for separating carbon dioxide from a to-be-treated gas containing the carbon dioxide with use of a carbon dioxide adsorbent and regenerating the adsorbent after the adsorbent has adsorbed the carbon dioxide. The carbon dioxide separation and recovery system includes: an adsorption reactor that adsorbs, by the adsorbent, carbon dioxide contained in the to-be-treated gas and discharges the to-be-treated gas from which the carbon dioxide has been removed; a desorption reactor that condenses desorbing steam on the adsorbent that has adsorbed the carbon dioxide to cause the carbon dioxide to desorb from the adsorbent; and an adsorbent dryer that dries the adsorbent until a water content ratio thereof becomes a predetermined value greater than or equal to a water content ratio limit by causing, with use of a drying gas, condensation water contained in the adsorbent from which the carbon dioxide has desorbed to evaporate as steam.

A carbon dioxide separation and recovery system according to another aspect of the present invention is a carbon dioxide separation and recovery system for separating carbon dioxide from a to-be-treated gas containing the carbon dioxide with use of a carbon dioxide adsorbent and regenerating the adsorbent after the adsorbent has adsorbed the carbon dioxide. The carbon dioxide separation and recovery system includes: an adsorption reactor that adsorbs, by the adsorbent, carbon dioxide contained in the to-be-treated gas and discharges the to-be-treated gas from which the carbon dioxide has been removed; a to-be-treated gas feeding unit that feeds the to-be-treated gas to the adsorption reactor; a desorption reactor that condenses desorbing steam on the adsorbent that has adsorbed the carbon dioxide; a steam feeder that feeds the desorbing steam to the desorption reactor; a carbon dioxide recovery unit that recovers carbon dioxide that has desorbed from the adsorbent in the desorption reactor; an adsorbent dryer that dries the adsorbent until a water content ratio thereof becomes a predetermined value greater than or equal to a water content ratio limit by causing, with use of a drying gas, condensation water contained in the adsorbent from which the carbon dioxide has desorbed to evaporate as steam; and a drying gas feeder that feeds the drying gas to the adsorbent dryer.

The above carbon dioxide separation and recovery system may further include: a thermometer that detects a temperature of the adsorbent in the adsorbent dryer; and an adsorbent dryer controller configured to adjust at least one of a feeding flow rate of the drying gas, a temperature of the drying gas, and a retention time of the adsorbent in the adsorbent dryer, such that the temperature detected by the thermometer is a temperature corresponding to the water content ratio limit of the adsorbent. Alternatively, in the above carbon dioxide separation and recovery system, the adsorbent dryer may be a moving bed adsorbent dryer in which the adsorbent serves as a moving bed, and the carbon dioxide separation and recovery system may further include: a thermometer that detects a temperature of the adsorbent near an outlet of the adsorbent dryer; and an adsorbent dryer controller configured to adjust at least one of a feeding flow rate of the drying gas, a temperature of the drying gas, and a retention time of the adsorbent in the adsorbent dryer, such that the temperature detected by the thermometer is a temperature corresponding to the water content ratio limit of the adsorbent.

The above carbon dioxide separation and recovery system may further include: a water amount meter that detects an amount of water in an exhaust gas discharged from the adsorbent dryer; and an adsorbent dryer controller configured to adjust at least one of a feeding flow rate of the drying gas, a temperature of the drying gas, and a retention time of the adsorbent in the adsorbent dryer, such that the amount of water detected by the water amount meter is an amount of water in the desorbing steam that is fed to the desorption reactor.

The above carbon dioxide separation and recovery system may further include: a water content ratio meter that detects the water content ratio of the adsorbent in the adsorbent dryer; and an adsorbent dryer controller configured to adjust at least one of a feeding flow rate of the drying gas, a temperature of the drying gas, and a retention time of the adsorbent in the adsorbent dryer, such that the water content ratio detected by the water content ratio meter is the predetermined value greater than or equal to the water content ratio limit. Alternatively, in the above carbon dioxide separation and recovery system, the adsorbent dryer may be a moving bed adsorbent dryer in which the adsorbent serves as a moving bed, and the carbon dioxide separation and recovery system may further include: a water content ratio meter that detects the water content ratio of the adsorbent near an outlet of the adsorbent dryer; and an adsorbent dryer controller configured to adjust at least one of a feeding flow rate of the drying gas, a temperature of the drying gas, and a retention time of the adsorbent in the adsorbent dryer, such that the water content ratio detected by the water content ratio meter is the predetermined value greater than or equal to the water content ratio limit.

According to the above carbon dioxide separation and recovery system, the temperature of the adsorbent from which $CO_2$ has desorbed in the desorption reactor has increased to be close to the temperature of the desorbing steam. When the adsorbent is brought into contact with the drying gas in the adsorbent dryer, heat is taken away from the adsorbent in accordance with evaporation of water adhered to the adsorbent, and the temperature of the adsorbent decreases to an adsorption temperature, which is the wet-bulb temperature of the drying gas. The adsorbent whose temperature is the adsorption temperature is discharged from the adsorbent dryer, and utilized for the $CO_2$ adsorption in the adsorption reactor. In the above-described system, the temperature of the adsorbent after being dried in the adsorbent dryer is the adsorption temperature. Therefore, equipment for cooling down the adsorbent to the adsorption temperature (e.g., a cooling tower) is unnecessary, and the adsorbent discharged from the adsorbent dryer can be directly carried into the adsorption reactor. For this reason, equipment for storing the adsorbent is unnecessary. This makes it possible to reduce the cost of the equipment for $CO_2$ recovery and adsorbent regeneration, reduce operational energy of the equipment, and realize further reduction of energy that is fed for the $CO_2$ recovery and adsorbent regeneration.

In the above carbon dioxide separation and recovery system, the to-be-treated gas may serve as the drying gas. In this case, the above carbon dioxide separation and recovery system may further include a to-be-treated gas passage, through which the to-be-treated gas discharged from the adsorbent dryer is fed to the adsorption reactor.

According to the above configuration, in the adsorbent dryer, the amount of heat contained in the adsorption heat generated when the adsorbent adsorbs $CO_2$ contained in the to-be-treated gas can be utilized for drying the adsorbent. In addition, equipment (such as a duct burner) and a fuel for generating the drying gas are unnecessary. Therefore, compared to a case where dry air is used as the drying gas, energy for drying the adsorbent can be reduced, and the adsorbent dryer and its peripheral equipment (such as piping) can be reduced in scale or eliminated. Moreover, part of the $CO_2$ contained in the to-be-treated gas is adsorbed by the adsorbent in the adsorbent dryer, and the remaining $CO_2$ is adsorbed by the adsorbent in the adsorption reactor. Accordingly, compared to the case where dry air is used as the drying gas, the amount of $CO_2$ to be adsorbed in the adsorption reactor is reduced, which makes it possible to reduce the scale of the adsorption reactor. This consequently makes it possible to reduce the scale of the entire carbon dioxide separation and recovery system.

In the above carbon dioxide separation and recovery system, each of the adsorption reactor, the desorption reactor, and the adsorbent dryer may be a moving bed chamber in which the adsorbent serves as a moving bed, and the adsorption reactor and the adsorbent dryer may be integrated together. The carbon dioxide separation and recovery system may further include a transfer unit that transfers the adsorbent discharged from the desorption reactor to the adsorbent dryer.

According to the above configuration, the carbon dioxide separation and recovery system includes two chambers, which are the desorption reactor and a chamber serving as both the adsorption reactor and the adsorbent dryer, and thereby the equipment is simplified. This makes it possible to reduce the initial cost, running cost, and operational energy.

A carbon dioxide separation and recovery method according to the present invention includes: adsorbing, by a carbon dioxide adsorbent, carbon dioxide in a to-be-treated gas containing the carbon dioxide; desorbing the carbon dioxide from the adsorbent by bringing the adsorbent into contact with desorbing steam to condense the desorbing steam on the adsorbent; and drying the adsorbent until a water content ratio thereof becomes a predetermined value greater than or equal to a water content ratio limit by bringing a drying gas into contact with the adsorbent to cause condensation water contained in the adsorbent to evaporate as steam.

In the above carbon dioxide separation and recovery method, drying the adsorbent may include drying the adsorbent until a temperature of the adsorbent becomes a temperature corresponding to the water content ratio limit of the adsorbent.

In the above carbon dioxide separation and recovery method, drying the adsorbent may include drying the adsorbent until an amount of water that has evaporated from the adsorbent becomes an amount of water contained in the desorbing steam condensed on the adsorbent.

According to the above carbon dioxide separation and recovery method, the temperature of the adsorbent from which $CO_2$ has desorbed has increased to be close to the temperature of the desorbing steam. When the adsorbent is brought into contact with the drying gas, heat is taken away from the adsorbent in accordance with evaporation of water adhered to the adsorbent, and the temperature of the adsorbent decreases. Therefore, equipment for cooling down the adsorbent (e.g., a cooling tower) is unnecessary, and the dried adsorbent can be directly fed for the $CO_2$ adsorption. For this reason, equipment for storing the adsorbent is unnecessary. This makes it possible to reduce the cost of the equipment for $CO_2$ recovery and adsorbent regeneration, reduce operational energy of the equipment, and realize further reduction of energy that is fed for the $CO_2$ recovery and adsorbent regeneration.

Advantageous Effects of Invention

According to the present invention, equipment for cooling down the adsorbent after drying the adsorbent is unnecessary. Accordingly, the cost and operational energy of the equipment can be eliminated, which makes it possible to realize further reduction of energy that is fed for $CO_2$ recovery.

DESCRIPTION OF EMBODIMENTS

A carbon dioxide separation and recovery system according to the present invention is a system for recovering carbon dioxide ($CO_2$) contained in a to-be-treated gas, such as a flue gas, and regenerating an adsorbent used for the $CO_2$ recovery. To be more specific, the carbon dioxide separation and recovery system performs: adsorbing, by a solid carbon dioxide adsorbent (which is hereinafter simply referred to as an "adsorbent"), $CO_2$ contained in the to-be-treated gas; after the adsorbent has adsorbed the $CO_2$, causing the $CO_2$ to desorb from the adsorbent to regenerate the adsorbent; recovering the $CO_2$ that has desorbed from the adsorbent; and drying the regenerated adsorbent.

A solid adsorbing agent serving as the adsorbent used in the present invention can be prepared by loading an amine compound onto a porous material. Examples of a porous material that can be used to prepare the carbon dioxide adsorbent include silica gel, activated carbon, activated alumina, and metal oxides.

Embodiment 1

Figure 1:
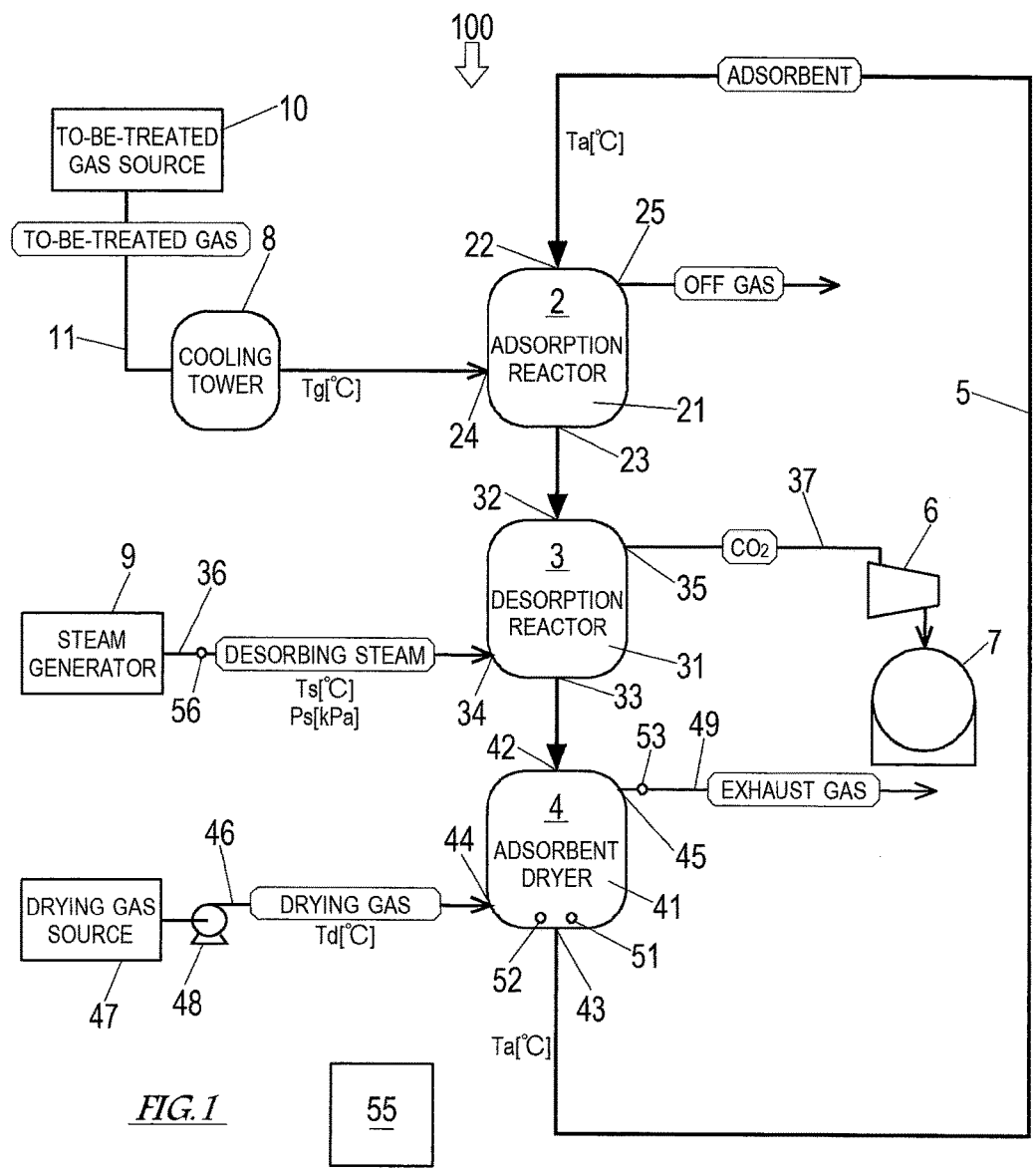
FIG. 1 shows a schematic configuration of a carbon dioxide separation and recovery system according to Embodiment 1 of the present invention.

Next, Embodiment 1 of the present invention is described with reference to the drawings. FIG. 1 shows a schematic configuration of a carbon dioxide separation and recovery system 100 according to Embodiment 1 of the present invention. As shown in FIG. 1, the carbon dioxide separation and recovery system 100 includes a moving bed adsorption reactor 2, in which the adsorbent serves as a moving bed, a desorption reactor 3, an adsorbent dryer 4, and a conveyor 5. The carbon dioxide separation and recovery system 100 according to the present embodiment is installed next to a cement plant. A gas to be treated by the carbon dioxide separation and recovery system 100 is a coal flue gas discharged from a preheater boiler of the cement plant.

The adsorption reactor 2 includes at least: an adsorption container 21 including an inlet 22 and an outlet 23; a to-be-treated gas feeding port 24; and an off gas discharge port 25. The adsorption reactor 2 performs: receiving the adsorbent that is conveyed by the conveyor 5; adsorbing, by the adsorbent, $CO_2$ contained in the to-be-treated gas; discharging the to-be-treated gas from which the $CO_2$ has been removed (i.e., off gas); and discharging the adsorbent that has adsorbed the $CO_2$.

The adsorption container 21 contains the adsorbent that forms a moving bed moving downward. The inlet 22 of the adsorption container 21 is provided at the top of the reactor. Through the inlet 22, the adsorbent is fed to the adsorption container 21 by the conveyor 5 at a predetermined speed. The outlet 23 of the adsorption container 21 is provided at the bottom of the reactor. Through the outlet 23, the adsorbent that has adsorbed $CO_2$ is discharged. The to-be-treated gas feeding port 24 is provided at a lower part of the reactor. Through the to-be-treated gas feeding port 24, the to-be-treated gas is fed to the adsorption container 21. The to-be-treated gas feeding port 24 is connected to a gas feeding passage 11. The to-be-treated gas from a to-be-treated gas source 10 is sent to the adsorption reactor 2 through the gas feeding passage 11. A cooling tower 8, which cools down the to-be-treated gas to a predetermined temperature (Tg [° C.]), is provided on the gas feeding passage 11. The gas feeding passage 11, the to-be-treated gas source 10, the cooling tower 8, and so forth form a to-be-treated gas feeding unit, which feeds the to-be-treated gas to the adsorption reactor 2. Desirably, before the to-be-treated gas is introduced into the adsorption reactor 2, the to-be-treated gas is subjected to pretreatments in accordance with its components and temperature, such as desulfurization, dust removal, cooling, and dehumidification. The off gas discharge port 25 is provided at an upper part of the reactor. Through the off gas discharge port 25, the off gas resulting from removing $CO_2$ from the to-be-treated gas (i.e., $CO_2$ free gas) is discharged to the outside of the system. It should be noted that the off gas discharge port 25 may be provided with a purifier, such as a filter, depending on the composition of the off gas discharged through the off gas discharge port 25.

The desorption reactor 3 is provided immediately below the adsorption reactor 2. The desorption reactor 3 includes at least: a regeneration container 31 including an inlet 32 and an outlet 33; a steam feeding port 34; and a carbon dioxide discharge port 35. The desorption reactor 3 performs: receiving the adsorbent discharged from the adsorption reactor 2; condensing desorbing steam on the adsorbent to cause $CO_2$ to desorb from the adsorbent; discharging the $CO_2$ that has desorbed from the adsorbent; and discharging the adsorbent that has been regenerated by the $CO_2$ desorption.

The regeneration container 31 contains the adsorbent that has been discharged from the adsorption reactor 2. The adsorbent forms a moving bed moving downward within the regeneration container 31. In the regeneration container 31, the desorbing steam fed thereto is condensed on the adsorbent, so that $CO_2$ desorbs from the adsorbent, and thereby the adsorbent is regenerated. The inlet 32 of the regeneration container 31 is provided at the top of the reactor. Through the inlet 32, the adsorbent that has adsorbed $CO_2$ in the adsorption reactor 2 is fed into the regeneration container 31. The outlet 33 of the regeneration container 31 is provided at the bottom of the reactor. Through the outlet 33, the regenerated adsorbent is discharged. The steam feeding port 34 is provided at a lower part of the reactor. Through the steam feeding port 34, the desorbing steam is fed to the regeneration container 31. The steam feeding port 34 is connected to a steam feeding passage 36. The desorbing steam from a steam generator 9 is sent to the desorption reactor 3 through the steam feeding passage 36. The steam feeding passage 36 is provided with a flowmeter 56, which detects the flow rate of the desorbing steam. The steam feeding passage 36, the steam generator 9, and so forth form a steam feeder, which feeds the desorbing steam to the desorption reactor 3. The carbon dioxide discharge port 35 is provided at an upper part of the reactor. Through the carbon dioxide discharge port 35, $CO_2$ that has desorbed from the adsorbent is discharged to the outside of the system. The carbon dioxide discharge port 35 is connected to a carbon dioxide holder 7 through a carbon dioxide recovery passage 37. A recovery pump 6 is provided on the carbon dioxide recovery passage 37. $CO_2$ that has been compressed by the recovery pump 6 is recovered into the carbon dioxide holder 7 and stored therein. The carbon dioxide recovery passage 37, the recovery pump 6, the carbon dioxide holder 7, and so forth form a $CO_2$ recovery unit, which recovers $CO_2$ that has desorbed from the adsorbent in the desorption reactor 3.

The adsorbent dryer 4 is provided immediately below the desorption reactor 3. The adsorbent dryer 4 includes at least: a drying container 41 including an inlet 42 and an outlet 43; a drying gas feeding port 44, and a high-humidity exhaust gas outlet 45. The adsorbent dryer 4 performs: receiving the adsorbent that has been discharged from the desorption reactor 3; drying the adsorbent until the water content ratio thereof becomes a predetermined value greater than or equal to a water content ratio limit by evaporating condensation water in the adsorbent as steam by using a drying gas; discharging an exhaust gas containing the steam that is generated when the adsorbent is dried; and discharging the dried adsorbent.

The drying container 41 contains the adsorbent that has been discharged from the desorption reactor 3. The adsorbent forms a moving bed moving downward within the drying container 41. The inlet 42 of the drying container 41 is provided at the top of the dryer. Through the inlet 42, the adsorbent regenerated in the desorption reactor 3 is fed into the drying container 41. The outlet 43 of the drying container 41 is provided at the bottom of the dryer. Through the outlet 43, the dried adsorbent is discharged. The adsorbent discharged from the adsorbent dryer 4 is conveyed to the inlet 22 of the adsorption reactor 2 by the conveyor 5, which serves as a transfer unit. The high-humidity exhaust gas outlet 45 is provided at an upper part of the dryer. Through the high-humidity exhaust gas outlet 45, the exhaust gas is discharged to the outside of the system through a steam discharge passage 49. The exhaust gas contains a large amount of steam that has flowed together with the adsorbent from the regeneration container 31 and a large amount of steam that has been generated in the drying container 41. It should be noted that the steam discharge passage 49 may be connected to the steam feeding port 34 of the desorption reactor 3 so that the exhaust gas from the adsorbent dryer 4 can be used as the desorbing steam in the desorption reactor 3. In this case, the steam generator 9 is unnecessary, and the desorbing steam circulates through the desorption reactor 3 and the adsorbent dryer 4. Accordingly, replenishment with merely a small amount of pure water that has been lost makes it possible to continue the $CO_2$ adsorption and desorption by the adsorbent.

The drying gas feeding port 44 is provided at a lower part of the dryer. Through the drying gas feeding port 44, the drying gas is fed to the drying container 41. The drying gas feeding port 44 is connected to a drying gas feeding passage 46. The drying gas from a drying gas source 47 is sent to the adsorbent dryer 4 through the drying gas feeding passage 46. In the present embodiment, the drying gas source 47 is an air quenching cooler of the cement plant. High-temperature dry air that has exchanged heat with clinker in the air quenching cooler is utilized as the drying gas. The temperature of the high-temperature dry air that is discharged from the air quenching cooler is lower than a necessary temperature of the drying gas of the adsorbent dryer 4. Therefore, a burner that heats up the high-temperature dry air to a predetermined temperature (Td [° C.]) is provided on the drying gas feeding passage 46. The drying gas feeding passage 46 is further provided with a flow rate adjuster 48. The flow rate adjuster 48 can adjust the flow rate of the drying gas fed to the drying container 41. The drying gas feeding passage 46, the drying gas source 47, the flow rate adjuster 48, and so forth form a drying gas feeder, which feeds the drying gas to the adsorbent dryer 4.

The adsorbent dryer 4 further includes: at least one of a thermometer 51, a water content ratio meter 52, and a water amount meter 53; and an adsorbent dryer controller 55. The thermometer 51 includes a probe that is set near the outlet 43 of the drying container 41. The thermometer 51 detects the temperature of the adsorbent that is about to be discharged through the outlet 43. It should be noted that probes of the thermometer 51 may be provided at multiple positions near the outlet 43, and the thermometer 51 may detect an average temperature of the adsorbent. The water content ratio meter 52 includes a probe that is set near the outlet 43 of the drying container 41. The water content ratio meter 52 detects the water content ratio of the adsorbent that is about to be discharged through the outlet 43. It should be noted that probes of the water content ratio meter 52 may be provided at multiple positions near the outlet 43, and the water content ratio meter 52 may detect an average water content ratio of the adsorbent. The water amount meter 53 is provided at the high-humidity exhaust gas outlet 45 or on the steam discharge passage 49 connected to the high-humidity exhaust gas outlet 45. The water amount meter 53 detects the amount of water in the exhaust gas discharged through the high-humidity exhaust gas outlet 45.

The adsorbent dryer controller 55 includes at least one processor (not shown). The processor includes at least one CPU (Central Processing Unit) and other components such as a ROM (Read Only Memory), a RAM (Random Access Memory), an I/F (Interface), and an I/O (Input/Output Port) (which are not shown). The ROM stores, for example, a program executed by the CPU and various fixed data. The program executed by the CPU is stored in a storage medium, such as a flexible disc, a CD-ROM, or a memory card. The program is installed into the ROM from any of these storage media. The RAM temporarily stores data that is necessary when the program is executed. The I/F transmits and receives data to and from an external device (e.g., a personal computer connected to the adsorbent dryer controller 55). The I/O performs input/output of detection signals from various sensors. In the processor, software such as the program stored in the ROM and hardware such as the CPU work together to perform processes that realize functions as the adsorbent dryer controller 55.

Figure 2:
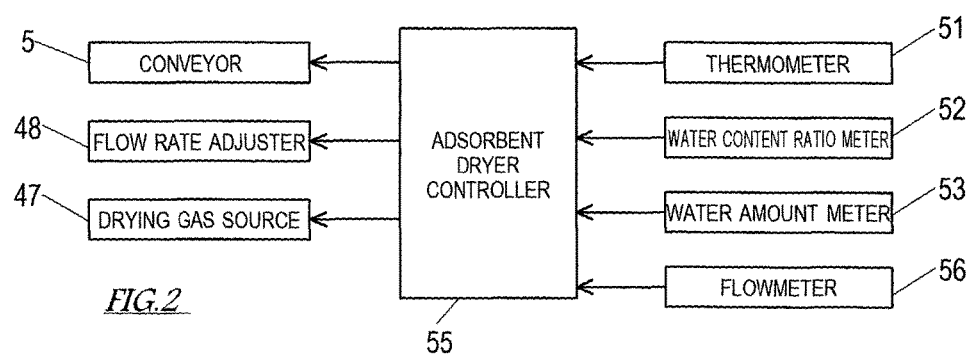
FIG. 2 shows a control configuration of an adsorbent dryer.

FIG. 2 shows a control configuration of the adsorbent dryer. As shown in FIG. 2, the adsorbent dryer controller 55 is electrically connected to the drying gas source 47. The adsorbent dryer controller 55 controls the drying gas source 47, such that the temperature of the drying gas fed to the adsorbent dryer 4 is the desirable temperature (Td [° C.]). It should be noted that, in the present embodiment, in order to adjust the temperature of the drying gas fed to the adsorbent dryer 4, the adsorbent dryer controller 55 controls the thermal power of the burner, which heats up the high-temperature air discharged from the air quenching cooler. The adsorbent dryer controller 55 is electrically connected to the flow rate adjuster 48, and controls the flow rate adjuster 48 such that the flow rate of the drying gas fed to the adsorbent dryer 4 is a desirable flow rate. The adsorbent dryer controller 55 is also electrically connected to the conveyor 5, and controls the conveyor 5 such that a retention time over which the adsorbent (moving bed) is retained in the adsorbent dryer 4 is a desirable time. It should be noted that, since the adsorption reactor 2, the desorption reactor 3, and the adsorbent dryer 4 are connected in series in the present embodiment, the feeding amount of the adsorbent fed to the adsorbent dryer 4 can be increased or decreased by increasing or decreasing the feeding amount of the adsorbent fed to the adsorption reactor 2. Also, by increasing or decreasing the feeding amount of the adsorbent fed to the adsorbent dryer 4 to change the moving speed of the adsorbent (moving bed), the retention time of the adsorbent in the adsorbent dryer 4 can be adjusted.

Detection signals from respective measurement devices, i.e., the thermometer 51, the water content ratio meter 52, the water amount meter 53, and the flowmeter 56, are inputted to the adsorbent dryer controller 55. Then, based on at least one of the measurement results obtained from the thermometer 51, the water content ratio meter 52, and the water amount meter 53, the adsorbent dryer controller 55 adjusts at least one of the flow rate of the drying gas, the temperature of the drying gas, and the retention time of the adsorbent in the adsorbent dryer 4, such that the water content ratio of the adsorbent discharged from the adsorbent dryer 4 is a predetermined value greater than or equal to the water content ratio limit.

Next, a carbon dioxide separation and recovery method adopted by the carbon dioxide separation and recovery system 100 with the above-described configuration is described.

The adsorbent with a suitable temperature for $CO_2$ adsorption (hereinafter, "adsorption temperature Ta") is fed to the adsorption reactor 2 at a predetermined feeding speed. A temperature in the range of 20 to 80° C. is suitable as the adsorption temperature Ta. In the present embodiment, Ta=about 40 [° C.]. The to-be-treated gas that contains 10 to 30% of $CO_2$ and whose pressure is close to the normal pressure is fed to the adsorption reactor 2 packed with the adsorbent at a predetermined feeding speed. The to-be-treated gas introduced into the adsorption reactor 2 has previously been cooled down in the cooling tower 8 to a temperature Tg=about 35 [° C.]. The adsorbent, which is a moving bed, flows downward within the adsorption container 21 at a predetermined moving speed due to its weight. While flowing downward within the adsorption container 21, the adsorbent comes into contact with the to-be-treated gas, adsorbs $CO_2$ contained in the to-be-treated gas, and is then discharged through the outlet 23 to be sent to the desorption reactor 3. The feeding speed of the to-be-treated gas and the moving speed of the adsorbent are set such that the $CO_2$ adsorption will be completed within the retention time in the adsorption reactor 2 and such that, as described below, the regeneration of the adsorbent will be completed within the retention time in the desorption reactor 3 and the drying of the adsorbent will be completed within the retention time in the adsorbent dryer 4.

The desorbing steam whose temperature is Ts [° C.] and whose pressure is Ps [kPa] is fed to the desorption reactor 3. A temperature in the range of 40 to 100 [° C.] is suitable as the temperature Ts, and a pressure in the range of 7 to 101 [kPa] is suitable as the pressure Ps corresponding to the temperature Ts. In the present embodiment, the desorbing steam is saturated steam with the temperature Ts=about 60 [° C.] and the pressure Ps=about 20 [kPa]. Accordingly, the pressure in the desorption reactor 3 is adjusted to about 20 [kPa] by the recovery pump 6. The adsorbent, which is a moving bed, flows downward within the regeneration container 31 at a predetermined moving speed due to its weight. While flowing downward within the regeneration container 31, the adsorbent comes into contact with the desorbing steam. The desorbing steam that has come into contact with the adsorbent is condensed on the surface of the adsorbent. At the time, the condensation heat of the desorbing steam is generated. The generated condensation heat is utilized as energy for $CO_2$ desorption. Such $CO_2$ desorption utilizing the condensation of the desorbing steam is completed within a short period of time, and in a steady state, the desorption reactor 3 is filled with $CO_2$ substantially 100%. $CO_2$ that has desorbed from the adsorbent is discharged from the desorption reactor 3, compressed by the recovery pump 6, and stored in the carbon dioxide holder 7. Meanwhile, the adsorbent that has been regenerated by the $CO_2$ desorption is discharged from the desorption reactor 3 and sent to the adsorbent dryer 4. The adsorbent that has been regenerated in the desorption reactor 3 contains the condensation water of the desorbing steam.

The drying gas whose temperature is Td [° C.] is fed to the adsorbent dryer 4 at a predetermined feeding speed. A temperature in the range of 40 to 120 [° C.] is suitable as the temperature Td. In the present embodiment, Td=about 80[° C.]. The adsorbent, which is a moving bed, flows downward within the drying container 41 at a predetermined moving speed due to its weight. While flowing downward within the drying container 41, the adsorbent comes into contact with the drying gas. The condensation water contained in the adsorbent that has come into contact with the drying gas evaporates to become steam. An exhaust gas containing the steam is discharged to the outside of the system through the high-humidity exhaust gas outlet 45. Meanwhile, the adsorbent that has been dried through the evaporation of the condensation water is discharged through the outlet 43, transferred to the adsorption reactor 2 by the conveyor 5, and then adsorbs $CO_2$ in the adsorption reactor 2 again.

Figure 10:
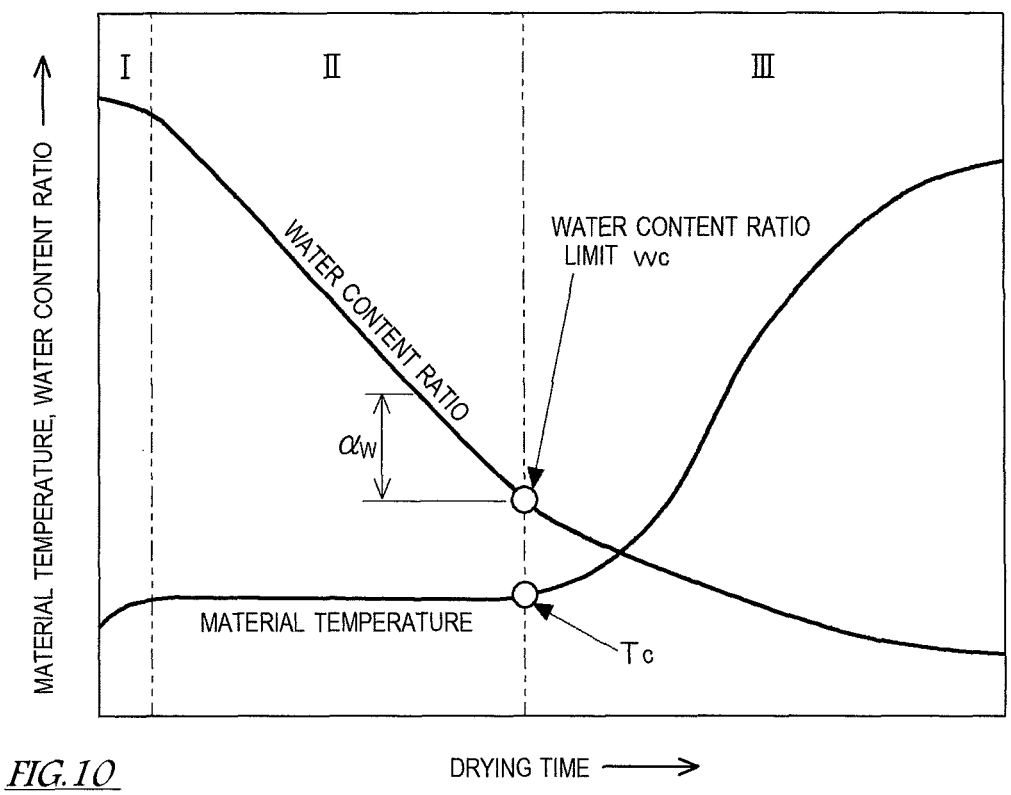
FIG. 10 is a graph showing temporal changes in an average water content ratio and a material temperature.

In the above-described adsorbent drying step, during the constant drying period II, the adsorbent is discharged from the adsorbent dryer 4 in a dried state where the water content ratio (or the average water content ratio) of the adsorbent is a predetermined value greater than or equal to the water content ratio limit $w_c$ (FIG. 10). The water content ratio of the adsorbent can be represented as the ratio of the weight of water in the adsorbent to the entire weight of the moist adsorbent. In a case where the entire weight of the moist adsorbent is W [kg] and the weight of the adsorbent in a dry solid form is $W_0$ [kg], the water content ratio w of the adsorbent on a dry basis is represented by an equation (1) below.

$$w=(W-W_0)/W_0 \qquad (1)$$

The water content ratio limit $w_c$ is a water content ratio at the time of shifting from the constant drying period II to the decreasing rate drying period III. The water content ratio limit $w_c$ varies depending not only on the characteristics of the adsorbent but also on external operating conditions such as a heating method to be adopted. It should be noted that the "predetermined value greater than or equal to the water content ratio limit $w_c$" is, as shown in FIG. 10, within a range from the value of the water content ratio limit $w_c$ to a value resulting from adding a predetermined allowable value $\alpha_W$ to the water content ratio limit $w_c$ ($w_c+\alpha_W$). The allowable value $\alpha_W$ is a value that is predetermined in consideration of, for example, stability and errors regarding the water content ratio limit $w_c$. The allowable value $\alpha_W$ is obtained experimentally or theoretically.

Figure 3:
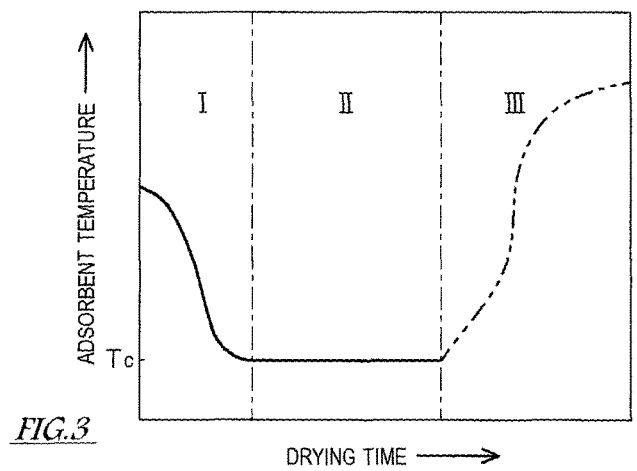
FIG. 3 is a graph showing a relationship between the temperature of an adsorbent and its drying time.

FIG. 3 is a graph showing a relationship between the temperature of the adsorbent and its drying time. As shown in FIG. 3, immediately after the start of the drying in the adsorbent dryer 4, the temperature of the adsorbent is close to the temperature Ts of the desorbing steam fed to the desorption reactor 3 (in the present embodiment, the temperature Ts is about 60° C.). As the drying of the adsorbent progresses, heat is taken away from the adsorbent in accordance with evaporation of water adhered to the adsorbent. The temperature of the adsorbent decreases to the wet-bulb temperature of the drying gas (preheating period I), and then becomes constant (constant drying period II). In the constant drying period II, until the water content ratio of the adsorbent decreases to the water content ratio limit $w_c$, the amount of heat fed to the adsorbent is entirely consumed in the evaporation of the water. Therefore, the temperature of the adsorbent stays substantially constant at the wet-bulb temperature of the drying gas. During the constant drying period II, i.e., before the temperature of the adsorbent increases again in the decreasing rate drying period III, the adsorbent with a suitable water content ratio (the predetermined value greater than or equal to the water content ratio limit $w_c$) is discharged from the adsorbent dryer 4. The temperature and humidity of the drying gas are adjusted by the to-be-treated gas feeding unit including the to-be-treated gas source 10, such that the wet-bulb temperature of the drying gas is the adsorption temperature Ta (in the present embodiment, about 40° C.). The temperature of the dried adsorbent discharged from the adsorbent dryer 4 is the adsorption temperature Ta.

Hereinafter, control performed by the adsorbent dryer controller 55 for adjusting the drying conditions of the adsorbent dryer 4 is described. The control described below is divided up into: [1] control based on the temperature of the adsorbent; [2] control based on the water content ratio of the adsorbent; and [3] control based on the amount of water in the steam discharged from the adsorbent dryer 4. Fundamentally, the adsorbent dryer controller 55 is configured to adopt and perform one of the controls [1] to [3]. Measurement devices that are unnecessary for the adopted control can be eliminated from the carbon dioxide separation and recovery system 100. However, as an alternative, the adsorbent dryer controller 55 may be configured to control the adsorbent dryer 4 by a combination of two or more of the controls [1] to [3].

[1] Control Based on Temperature of Adsorbent

The adsorbent dryer controller 55 adjusts the drying conditions of the adsorbent dryer 4 such that the temperature (or the average temperature) of the adsorbent near the outlet of the adsorbent dryer 4 is a predetermined temperature, i.e., a temperature $T_c$ (FIG. 10) corresponding to the water content ratio limit $w_c$ of the adsorbent. The temperature of the adsorbent near the outlet of the adsorbent dryer 4 is detected by the thermometer 51. The temperature $T_c$ corresponding to the water content ratio limit $w_c$ is the wet-bulb temperature of the drying gas (the adsorption temperature Ta). In a case where the water content ratio of the adsorbent is estimated based on the temperature of the adsorbent, there is a possibility that even if the temperature of the adsorbent is the temperature $T_c$ corresponding to the water content ratio limit $w_c$, the water content ratio of the adsorbent has not yet decreased to the water content ratio limit $w_c$. That is, there is a possibility that the adsorbent is discharged from the adsorbent dryer 4 when the water content ratio thereof is still greater than the water content ratio limit $w_c$. However, the adsorbent is formed of a porous material, and it is known that the porous material has such characteristics that the constant drying period II thereof is short. Therefore, by decreasing the temperature of the adsorbent to the temperature $T_c$ corresponding to the water content ratio limit $w_c$, the adsorbent with a water content ratio within a suitable range will be discharged from the adsorbent dryer 4.

The drying condition(s) to be controlled by the adsorbent dryer controller 55 is at least one of the following conditions: the flow rate of the drying gas; the temperature of the drying gas; and the retention time of the adsorbent in the adsorbent dryer 4. Although only one of these drying conditions may be controlled, by controlling a combination of two or more of these drying conditions, the drying conditions of the adsorbent dryer 4 can be adjusted more effectively to be suitable for the drying of the adsorbent.

The flow rate of the drying gas can be adjusted by the flow rate adjuster 48 provided on the drying gas feeding passage 46. For example, the flow rate adjuster 48 is one of various flow rate adjusting units that operate in accordance with control by the adsorbent dryer controller 55, such as a valve, a pump, or a fan. As shown in FIG. 3, the temperature of the adsorbent decreases gradually in the preheating period I, and becomes substantially constant at the temperature $T_c$ corresponding to the water content ratio limit $w_c$ in the constant drying period II. Assuming that the adsorbent is dried such that the water content ratio thereof becomes less than the water content ratio limit $w_c$, the temperature of the adsorbent increases after entering the decreasing rate drying period III. After the temperature of the adsorbent has become the temperature $T_c$ corresponding to the water content ratio limit $w_c$ and before the temperature of the adsorbent increases, the adsorbent dryer controller 55 controls the drying condition(s) such that the adsorbent is discharged from the adsorbent dryer 4. Specifically, when the detected temperature of the adsorbent is higher than the temperature $T_c$ corresponding to the water content ratio limit $w_c$, the adsorbent dryer controller 55 controls the flow rate adjuster 48 to increase the flow rate of the drying gas if the current period is the preheating period I and to decrease the flow rate of the drying gas if the current period is the decreasing rate drying period III.

The temperature of the drying gas can be adjusted by changing the temperature to which the drying gas is heated up at the drying gas source 47. When the detected temperature of the adsorbent is higher than the temperature $T_c$ corresponding to the water content ratio limit $w_c$, the adsorbent dryer controller 55 controls the drying gas source 47 to increase the temperature of the drying gas if the current period is the preheating period I and to decrease the temperature of the drying gas if the current period is the decreasing rate drying period III.

The retention time of the adsorbent in the adsorbent dryer 4 can be adjusted by changing the feeding speed of the adsorbent fed by the conveyor 5 to the adsorption reactor 2. It should be noted that, alternatively, the retention time of the adsorbent in the adsorbent dryer 4 can be adjusted by providing a valve at the outlet 43 and adjusting the degree of opening of the valve to change the discharge speed of the adsorbent discharged from the adsorbent dryer 4. When the detected temperature of the adsorbent is higher than the temperature $T_c$ corresponding to the water content ratio limit $w_c$, the adsorbent dryer controller 55 controls the conveyor 5 to decrease the moving speed of the moving bed to lengthen the retention time of the adsorbent if the current period is the preheating period I and to increase the moving speed of the moving bed to shorten the retention time of the adsorbent if the current period is the decreasing rate drying period III.

[2] Control Based on Water Content Ratio of Adsorbent

The adsorbent dryer controller 55 adjusts the drying conditions of the adsorbent dryer 4, such that the adsorbent is discharged from the adsorbent dryer 4 when the water content ratio (or the average water content ratio) of the adsorbent measured by the water content ratio meter 52 is a predetermined value greater than or equal to the water content ratio limit $w_c$ (FIG. 10). The "predetermined value greater than or equal to the water content ratio limit $w_c$" is, as shown in FIG. 10, within a range from the value of the water content ratio limit $w_c$ to a value resulting from adding a predetermined allowable value $\alpha_W$ to the water content ratio limit $w_c$ ($w_c+\alpha_W$).

The drying condition(s) to be controlled by the adsorbent dryer controller 55 is at least one of the following conditions: the flow rate of the drying gas; the temperature of the drying gas; and the retention time of the adsorbent in the adsorbent dryer 4. The adsorbent dryer controller 55 controls the flow rate adjuster 48 to increase the flow rate of the drying gas if the detected water content ratio of the adsorbent is more than the predetermined value greater than or equal to the water content ratio limit $w_c$ and to decrease the flow rate of the drying gas if the detected water content ratio of the adsorbent is less than the predetermined value. The adsorbent dryer controller 55 controls the drying gas source 47 to increase the temperature of the drying gas if the detected water content ratio is more than the predetermined value greater than or equal to the water content ratio limit $w_c$ and to decrease the temperature of the drying gas if the detected water content ratio is less than the predetermined value. The adsorbent dryer controller 55 controls the conveyor 5 to decrease the moving speed of the moving bed to lengthen the retention time of the adsorbent if the detected water content ratio is more than the predetermined value greater than or equal to the water content ratio limit $w_c$ and to increase the moving speed of the moving bed to shorten the retention time of the adsorbent if the detected water content ratio is less than the predetermined value.

[3] Control Based on the Amount of Water in Steam Discharged from Adsorbent Dryer 4

The adsorbent dryer controller 55 controls the operation of the adsorbent dryer 4 such that the amount of water in the steam contained in the exhaust gas from the adsorbent dryer 4 is the amount of water that is fed to the desorption reactor 3 as the desorbing steam (i.e., the amount of water condensed on the adsorbent in the desorption reactor 3). The amount of water fed to the desorption reactor 3 as the desorbing steam is calculated based on the flow rate of the desorbing steam detected by the flowmeter 56 provided on the steam feeding passage 36 and the amount of water in the desorbing steam generated by the steam generator 9. The amount of water in the exhaust gas discharged from the adsorbent dryer 4 is detected by the water amount meter 53. The water amount meter 53 includes at least a temperature sensor, a flow sensor, and a humidity sensor. Based on detection values detected by these sensors, the amount of water discharged from the adsorbent dryer 4 through the high-humidity exhaust gas outlet 45 is measured.

Figure 4:
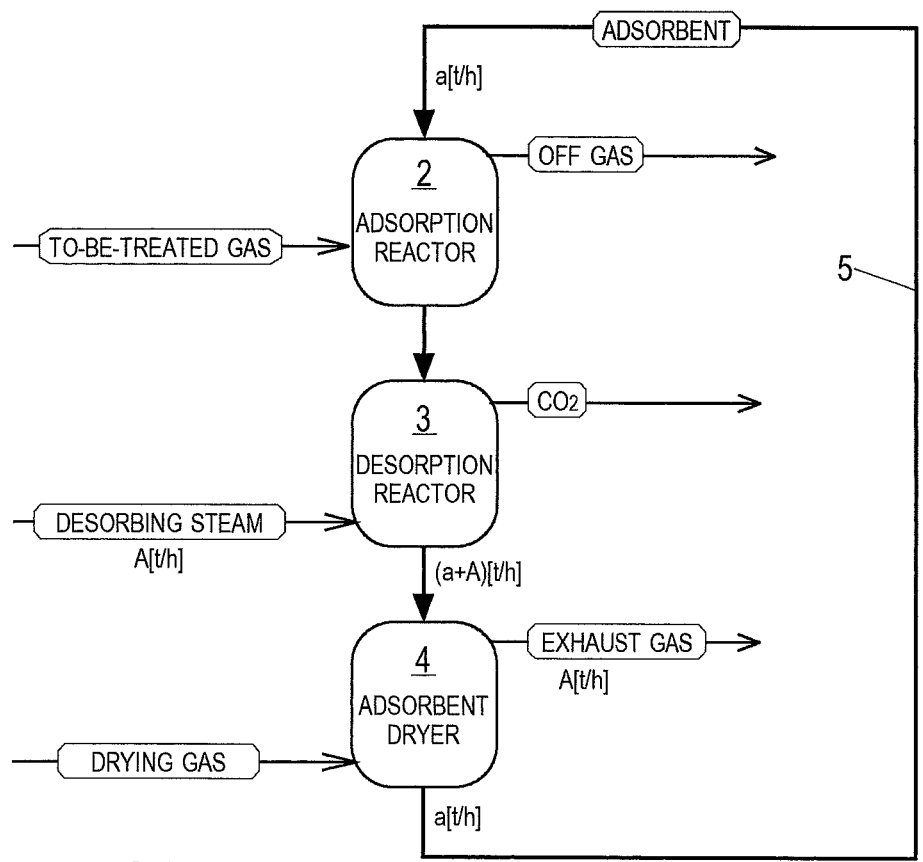
FIG. 4 indicates amounts of water flowing through inlets and outlets in the carbon dioxide separation and recovery system.

FIG. 4 indicates amounts of water flowing through inlets and outlets in the carbon dioxide separation and recovery system 100. It is assumed as shown in FIG. 4 that an amount of water a [t/hour] is fed to the adsorption reactor 2 in the state of being contained in the adsorbent, and that an amount of water A [t/hour] is fed to the desorption reactor 3 as the desorbing steam. Since the desorbing steam is condensed on the adsorbent in the desorption reactor 3, the amount of water discharged from the desorption reactor 3 and introduced into the adsorbent dryer 4 is (a+A) [t/hour]. The water content ratio of the adsorbent fed to the adsorption reactor 2 and the water content ratio of the adsorbent discharged from the adsorbent dryer 4 are both the predetermined value greater than or equal to the water content ratio limit. Accordingly, the amount of water discharged from the adsorbent dryer 4 in the state of being contained in the adsorbent is a [t/hour], and the amount of water discharged from the adsorbent dryer 4 as the exhaust gas is A [t/hour]. Based on the above assumption, when the amount of water discharged from the adsorbent dryer 4 as the exhaust gas is A [t/hour], the adsorbent whose water content ratio is the water content ratio limit is discharged from the adsorbent dryer 4. Accordingly, the adsorbent dryer controller 55 adjusts the drying conditions of the adsorbent dryer 4 such that the amount of water detected by the water amount meter 53 is the amount of water that is fed to the desorption reactor 3 as the desorbing steam.

The drying condition(s) to be controlled by the adsorbent dryer controller 55 is at least one of the following conditions: the flow rate of the drying gas; the temperature of the drying gas; and the retention time of the adsorbent in the adsorbent dryer 4. The adsorbent dryer controller 55 controls the flow rate adjuster 48 to decrease the flow rate of the drying gas if the detected amount of water is more than the amount of water that is fed to the desorption reactor 3 as the desorbing steam and to increase the flow rate of the drying gas if the detected amount of water is less than the amount of water that is fed to the desorption reactor 3 as the desorbing steam. The adsorbent dryer controller 55 controls the drying gas source 47 to decrease the temperature of the drying gas if the detected amount of water is more than the amount of water that is fed to the desorption reactor 3 as the desorbing steam and to increase the temperature of the drying gas if the detected amount of water is less than the amount of water that is fed to the desorption reactor 3 as the desorbing steam. The adsorbent dryer controller 55 controls the conveyor 5 to increase the moving speed of the moving bed to shorten the retention time of the adsorbent if the detected amount of water is more than the amount of water that is fed to the desorption reactor 3 as the desorbing steam and to decrease the moving speed of the moving bed to lengthen the retention time of the adsorbent if the detected amount of water is less than the amount of water that is fed to the desorption reactor 3 as the desorbing steam.

As described above, the desorption reactor 3 of the carbon dioxide separation and recovery system 100 according to the present embodiment adopts the technique of bringing the adsorbent and steam into direct contact with each other in order to cause $CO_2$ to desorb from the adsorbent. By adopting this technique, the latent heat of the steam can be obtained as energy utilized in the $CO_2$ desorption. Under the condition that the amount of water in the steam is the same, the amount of latent heat energy of the steam is greater than the amount of sensible heat energy of the steam. Therefore, by utilizing the latent heat of the steam, the amount of water necessary for causing $CO_2$ to desorb from the adsorbent can be reduced. Since the steam is not discharged from the desorption reactor, steam energy loss can be suppressed unlike the conventional art in which the steam energy is discarded without being utilized.

According to the above-described carbon dioxide separation and recovery system, the temperature of the adsorbent from which $CO_2$ has desorbed in the desorption reactor has increased to be close to the temperature of the desorbing steam. When the adsorbent is brought into contact with the drying gas in the adsorbent dryer 4, heat is taken away from the adsorbent in accordance with evaporation of water adhered to the adsorbent, and the temperature of the adsorbent decreases to the adsorption temperature Ta, which is the wet-bulb temperature of the drying gas. The adsorbent whose temperature is the adsorption temperature Ta is discharged from the adsorbent dryer, and utilized for the $CO_2$ adsorption in the adsorption reactor. In the above-described system, the temperature of the adsorbent after being dried in the adsorbent dryer 4 is the adsorption temperature Ta. Therefore, equipment for cooling down the adsorbent to the adsorption temperature (e.g., a cooling tower) is unnecessary, and the adsorbent discharged from the adsorbent dryer 4 can be directly carried into the adsorption reactor. For this reason, equipment for storing the adsorbent is unnecessary. This makes it possible to reduce the cost of the equipment for $CO_2$ recovery and adsorbent regeneration, reduce operational energy of the equipment, and realize further reduction of energy that is fed for the $CO_2$ recovery and adsorbent regeneration.

Embodiment 2

Figure 5:
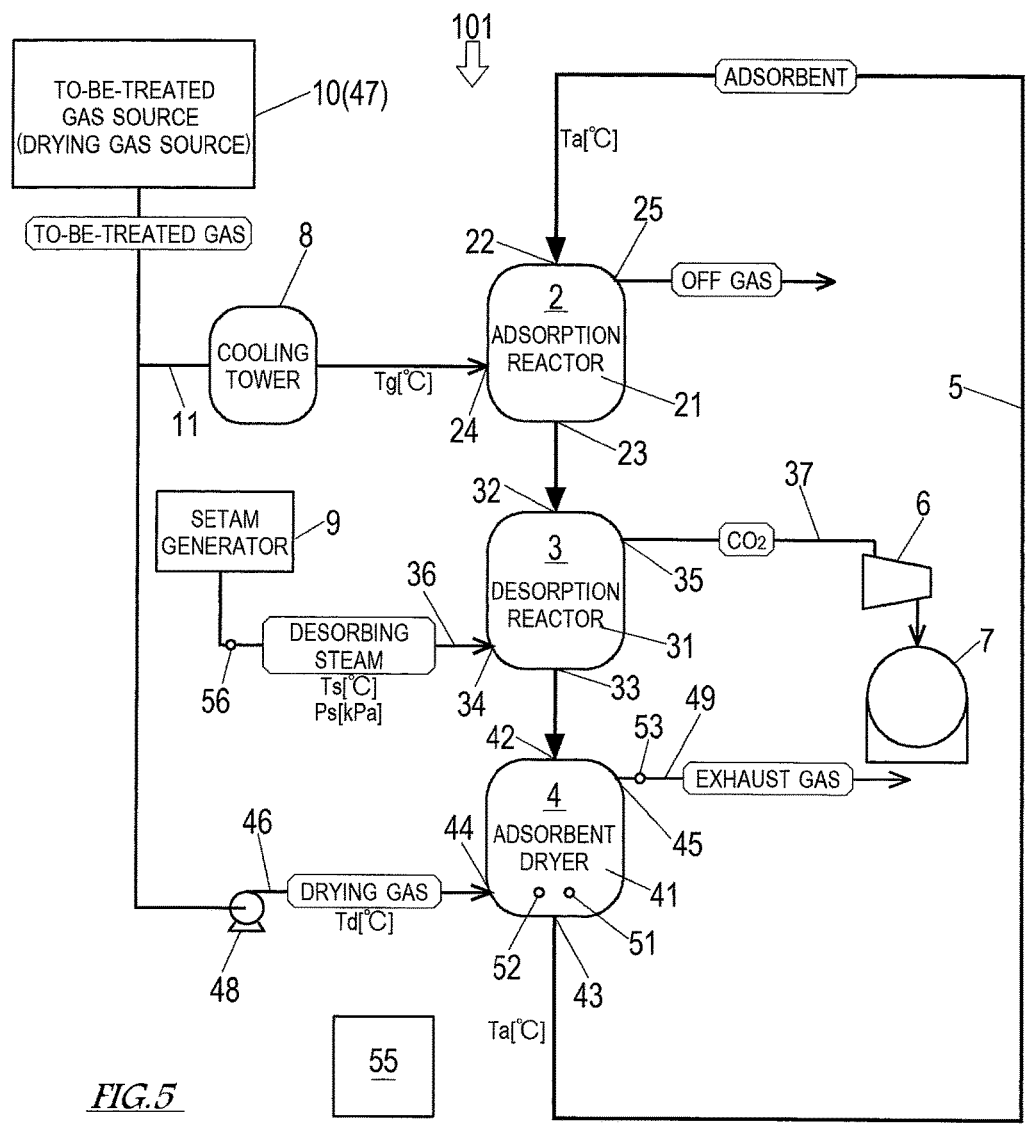
FIG. 5 shows a schematic configuration of a carbon dioxide separation and recovery system according to Embodiment 2 of the present invention.

Next, Embodiment 2 of the present invention is described. FIG. 5 shows a schematic configuration of a carbon dioxide separation and recovery system 101 according to Embodiment 2. As shown in FIG. 5, the configuration of the carbon dioxide separation and recovery system 101 according to the present embodiment is the same as the configuration described in Embodiment 1 except that the to-be-treated gas source 10 doubles as the drying gas source 47. It should be noted that, in the description of the present embodiment, components that are the same as or correspond to those described in Embodiment 1 are denoted by the same reference signs as those used in Embodiment 1, and the description of such components is omitted.

In the carbon dioxide separation and recovery system 101 according to Embodiment 2, the same gas as the to-be-treated gas is used as the drying gas. The to-be-treated gas source 10 doubles as the drying gas source 47. The to-be-treated gas source 10 and the drying gas feeding port 44 of the adsorbent dryer 4 are connected by the drying gas feeding passage 46. In the present embodiment, the to-be-treated gas is a coal flue gas, and the coal flue gas is fed to the adsorbent dryer 4 through the drying gas feeding passage 46 as the drying gas.

Figure 6:
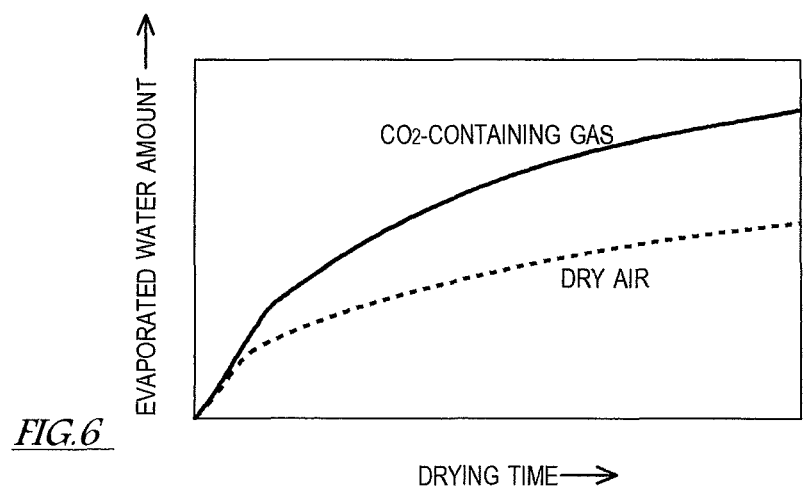
FIG. 6 is a graph showing temporal transition of the amount of water evaporated from the adsorbent in a case where a $CO_2$-containing gas serves as a dry heat conveying medium and in a case where dry air serves as a dry heat conveying medium.

The coal flue gas is a $CO_2$-containing gas. When the $CO_2$-containing gas is brought into contact with the adsorbent that has been regenerated in the desorption reactor 3, the adsorbent adsorbs part of the $CO_2$. At the time, adsorption heat is generated. The amount of heat contained in the adsorption heat is utilized for drying the adsorbent in the adsorbent dryer 4. FIG. 6 is a graph showing a relationship between the amount of water evaporated from the adsorbent and the drying time in a case where dry air and a $CO_2$-containing gas containing 20% of $CO_2$ are each fed as the drying gas to the adsorbent dryer 4 separately. The vertical axis of the graph represents the amount of water evaporated from the adsorbent, and the horizontal axis of the graph represents the drying time. It should be noted that the temperature and flow rate of the dry air are the same as those of the $CO_2$-containing gas. As is clear from the graph of FIG. 6, under the condition of the same drying time, a greater amount of water evaporates in the case where the $CO_2$-containing gas is used as the drying gas than in the case where the dry air is used as the drying gas. Thus, in the case where the $CO_2$-containing gas is used as the drying gas, the adsorbent can be dried within a shorter period of time and with a less flow rate of the drying gas than in the case where the dry air is used as the drying gas.

As described above, in the adsorbent dryer 4 of the carbon dioxide separation and recovery system 101 according to Embodiment 2, the amount of heat contained in the adsorption heat generated when the adsorbent adsorbs $CO_2$ contained in the to-be-treated gas can be utilized for drying the adsorbent. In addition, equipment (such as a duct burner) and a fuel for generating the drying gas are unnecessary. Therefore, compared to the case where dry air is used as the drying gas, energy for drying the adsorbent can be reduced, and the adsorbent dryer 4 and its peripheral equipment (such as piping) can be reduced in scale or eliminated. Moreover, part of the $CO_2$ contained in the to-be-treated gas is adsorbed by the adsorbent in the adsorbent dryer 4, and the remaining $CO_2$ is adsorbed by the adsorbent in the adsorption reactor 2. Accordingly, compared to the case where dry air is used as the drying gas, the amount of $CO_2$ to be adsorbed in the adsorption reactor 2 is reduced, which makes it possible to reduce the scale of the adsorption reactor 2. This consequently makes it possible to reduce the scale of the entire system.

[Variation 1]

Figure 7:
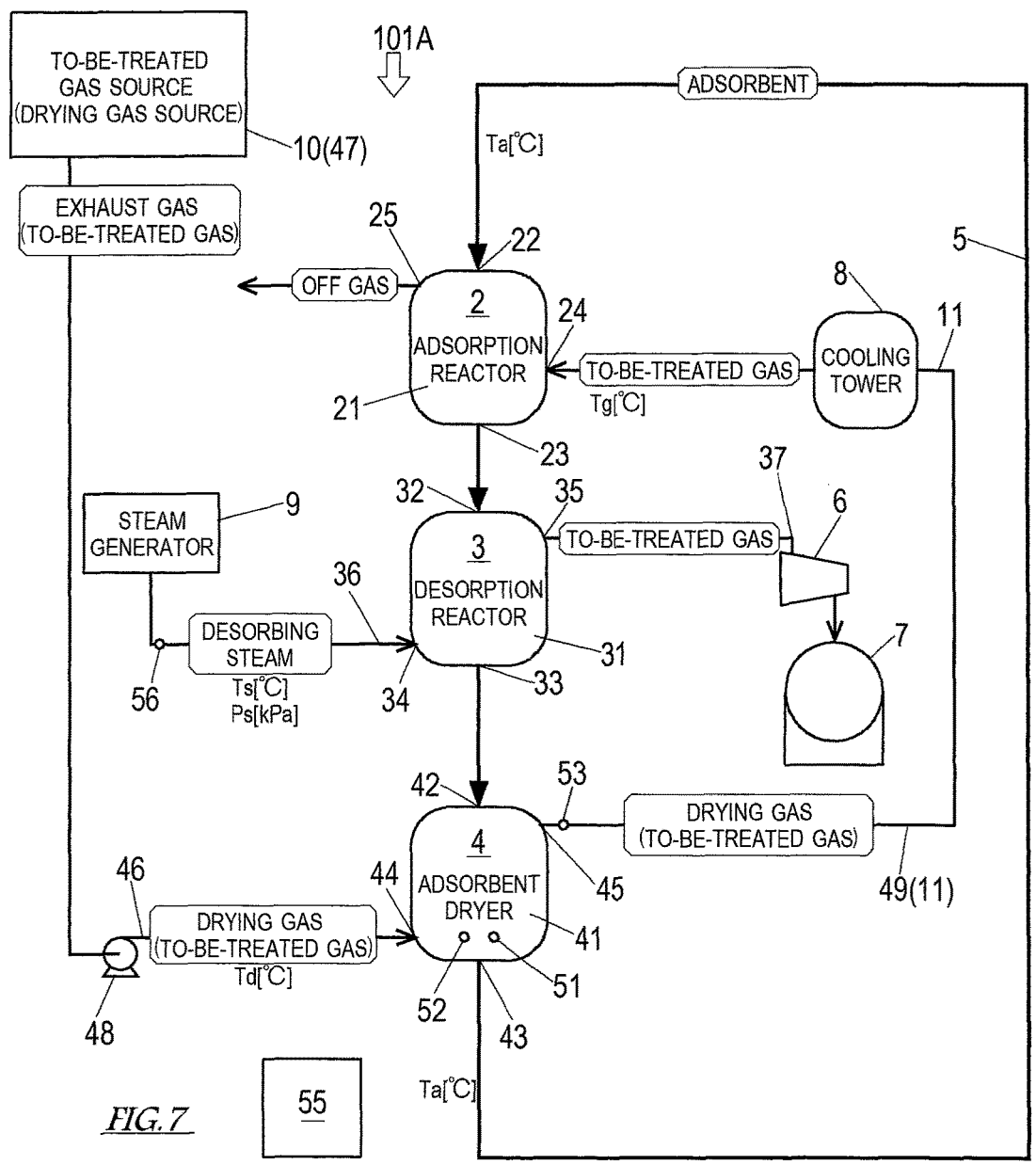
FIG. 7 shows a schematic configuration of a carbon dioxide separation and recovery system according to Variation 1 of Embodiment 2 of the present invention.

Next, Variation 1 of Embodiment 2 is described. FIG. 7 shows a schematic configuration of a carbon dioxide separation and recovery system 101A according to Variation 1 of Embodiment 2 of the present invention. As shown in FIG. 7, in the carbon dioxide separation and recovery system 101A according to Variation 1, the high-humidity exhaust gas outlet 45 of the adsorbent dryer 4 and the to-be-treated gas feeding port 24 of the adsorption reactor 2 are connected by the gas feeding passage 11. The cooling tower 8 is provided on the gas feeding passage 11. According to this configuration, the exhaust gas discharged from the adsorbent dryer 4 is cooled down in the cooling tower 8 to the predetermined temperature Tg [° C.], and is then fed to the adsorption reactor 2 as the to-be-treated gas.

In the carbon dioxide separation and recovery system 101A according to Variation 1, $CO_2$ contained in the to-be-treated gas is adsorbed by the adsorbent in the adsorbent dryer 4 and in the adsorption reactor 2. Here, a description is given along the flow of the to-be-treated gas. First, $CO_2$ contained in the to-be-treated gas is adsorbed by the adsorbent in the adsorbent dryer 4. Then, $CO_2$ contained in the to-be-treated gas is adsorbed by the adsorbent in the adsorption reactor 2. It should be noted that it is known that the higher the temperature, the less the amount of $CO_2$ adsorbed by the adsorbent. Accordingly, the amount of $CO_2$ removed from the to-be-treated gas is greater in the adsorption reactor 2 than in the adsorbent dryer 4. As thus described, in the carbon dioxide separation and recovery system 100 according to Variation 1, the amount of $CO_2$ that needs to be removed in the adsorption reactor 2 is reduced compared to Embodiments 1 and 2. This makes it possible to reduce the scale of the adsorption reactor 2.

[Variation 2]

Figure 8:
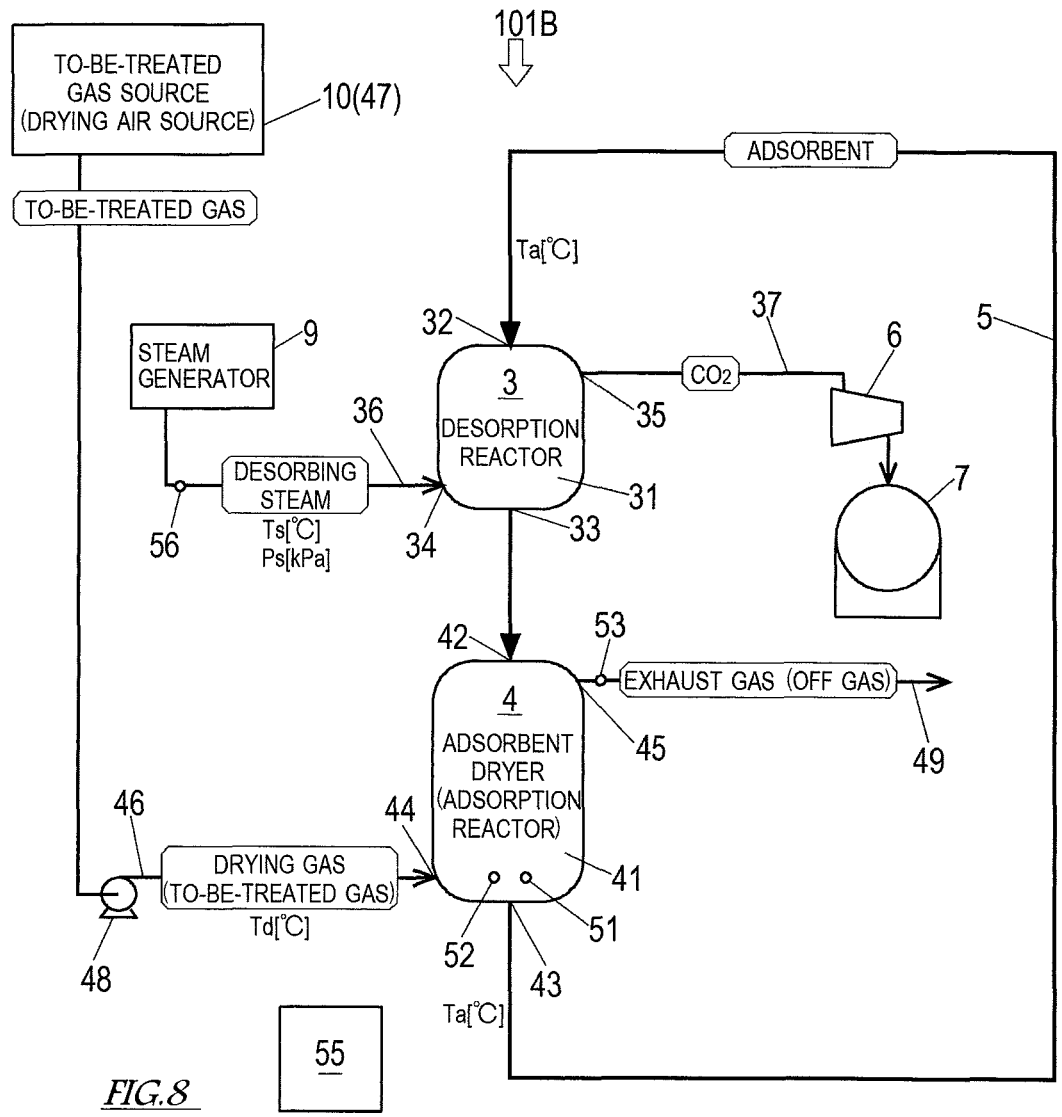
FIG. 8 shows a schematic configuration of a carbon dioxide separation and recovery system according to Variation 2 of Embodiment 2 of the present invention.
Figure 9:
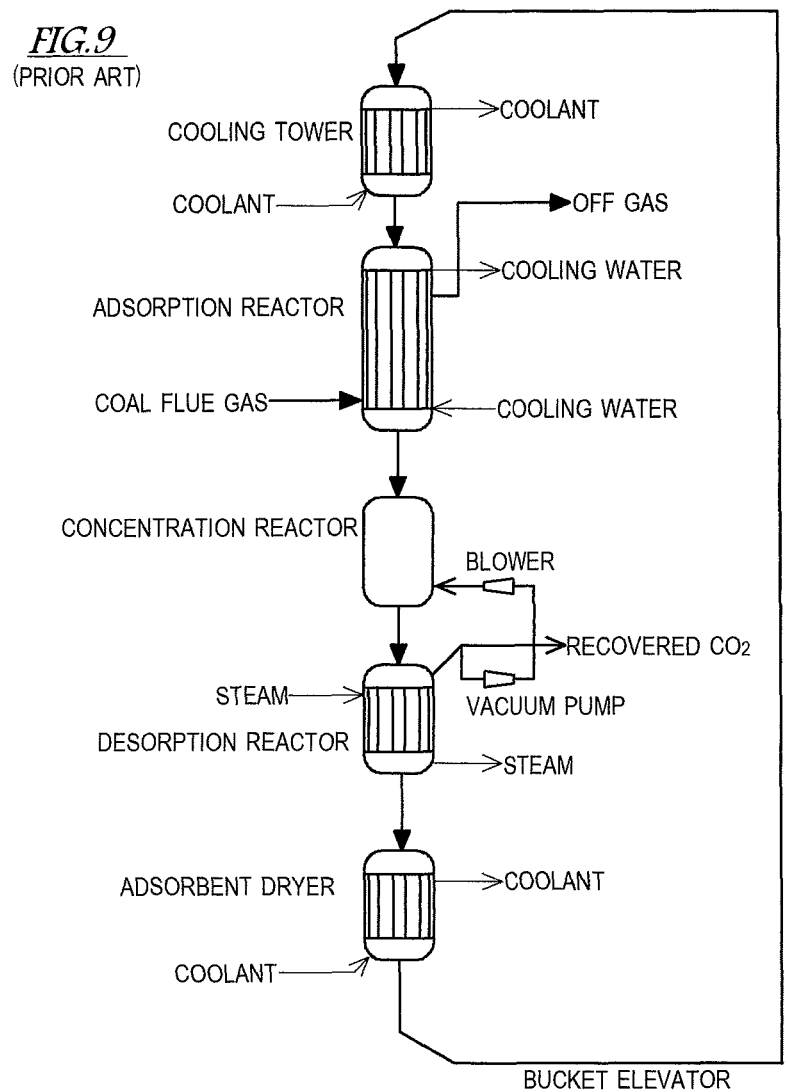
FIG. 9 is a block diagram showing an overall configuration of a conventional carbon dioxide separation and recovery system.

Next, Variation 2 of Embodiment 2 is described. FIG. 8 shows a schematic configuration of a carbon dioxide separation and recovery system 101B according to Variation 2 of Embodiment 2 of the present invention. As shown in FIG. 8, in the carbon dioxide separation and recovery system 101B according to Variation 2, the drying container 41 of the adsorbent dryer 4 is greater in size, and the adsorption reactor 2 is eliminated. In Variation 2, the adsorbent dryer 4 functions also as the adsorption reactor 2 of the carbon dioxide separation and recovery system 100 of Embodiment 1.

In the carbon dioxide separation and recovery system 101B according to Variation 2, the adsorbent discharged from the adsorbent dryer 4 is carried into the desorption reactor 3 without passing through the adsorption reactor 2. The adsorbent regenerated in the desorption reactor 3 is fed to the adsorbent dryer 4. The adsorbent dryer 4 is fed with a coal flue gas that is the to-be-treated gas from the to-be-treated gas source 10. $CO_2$ contained in the to-be-treated gas is adsorbed by the adsorbent in the adsorbent dryer 4, and the resulting off gas from which $CO_2$ has been removed is released from the high-humidity exhaust gas outlet 45 together with steam. Meanwhile, the to-be-treated gas that has been fed to the adsorbent dryer 4 acts as the drying gas, and as described in Embodiment 1, the adsorbent in the adsorbent dryer 4 is discharged from the adsorbent dryer 4 after the adsorbent is dried such that the water content ratio thereof is reduced to the water content ratio limit.

The carbon dioxide separation and recovery system 101B according to Variation 2 includes two chambers, which are the desorption reactor and a chamber serving as both the adsorption reactor and the adsorbent dryer. Therefore, compared to Embodiment 1, Embodiment 2, and Variation 1 of Embodiment 2, the entire equipment can be simplified since the adsorption reactor 2 and its peripheral equipment are eliminated. This makes it possible to reduce the initial cost, running cost, and operational energy.

Preferred embodiments of the present invention (Embodiment 1 and Embodiment 2) and the variations thereof (Variation 1 and Variation 2) have been described above. The above-described configurations can be modified as described below.

The above-described carbon dioxide separation and recovery systems adopt moving-bed treatment chambers (the adsorption reactor 2, the desorption reactor 3, and the adsorbent dryer 4), in each of which the adsorbent serves as a moving bed. However, as an alternative, each carbon dioxide separation and recovery system may be configured by using, for example, batch-type treatment chambers. In a case where each treatment chamber is of a batch type, an opening/closing member such as a valve or a shutter is provided at a lower part of each of the adsorption reactor 2, the desorption reactor 3, and the adsorbent dryer 4. When the treatment in each treatment chamber is completed, the opening/closing member thereof is opened and closed. In this manner, a plurality of batches of the adsorbent are moved one by one to the treatment chamber positioned below. In this case, desirably, the probe of the thermometer 51 detecting the temperature of the adsorbent and the probe of the water content ratio meter 52 detecting the water content ratio of the adsorbent are provided not near the outlet of the drying container 41 but on the most downstream portion of a drying air passage in the drying container 41, or a plurality of such probes are provided in the drying container 41 in a dispersed manner.

Alternatively, for example, the above-described carbon dioxide separation and recovery systems may be configured by using fixed-bed treatment chambers. In a case where fixed-bed treatment chambers are used, piping for feeding the to-be-treated gas, piping for discharging the off gas from which $CO_2$ has been removed, piping for feeding the desorbing steam, piping for discharging $CO_2$ that has desorbed from the adsorbent, piping for feeding the drying gas, and piping for discharging the steam-containing exhaust gas are connected to one treatment container, and valves are provided, each of which selectively allows or blocks the flow of a fluid (gas) between its corresponding piping and its corresponding treatment chamber. In this case, desirably, the probe of the thermometer 51 detecting the temperature of the adsorbent and the probe of the water content ratio meter 52 detecting the water content ratio of the adsorbent are provided not near the outlet of the treatment container but on the most downstream portion of a drying air passage in the treatment container, or a plurality of such probes are provided in the treatment container in a dispersed manner.

In the above description, as one example, each carbon dioxide separation and recovery system is installed next to a cement plant, and is a system for treating a coal flue gas of a preheater boiler. However, the present invention is not thus limited. The present invention is widely applicable to various systems for separating and recovering $CO_2$ from a $CO_2$-containing gas.

REFERENCE SIGNS LIST

100, 101 carbon dioxide separation and recovery system
  2 adsorption reactor
    21 adsorption container
    22 inlet
    23 outlet
    24 to-be-treated gas feeding port
    25 off gas discharge port
  3 desorption reactor
    31 regeneration container
    32 inlet
    33 outlet
    34 steam feeding port
    35 carbon dioxide discharge port
    36 steam feeding passage
    37 carbon dioxide recovery passage
  4 adsorbent dryer
    41 drying container
    42 inlet
    43 outlet
    44 drying gas feeding port
    45 high-humidity exhaust gas outlet
    46 drying gas feeding passage
    47 drying gas source
    48 flow rate adjuster
    49 steam discharge passage
  5 conveyor
  6 recovery pump
  7 carbon dioxide holder
  8 cooling tower
  9 steam generator
  10 to-be-treated gas source
  11 to-be-treated gas feeding passage

The invention claimed is:

1. A carbon dioxide separation and recovery system for separating carbon dioxide from a to-be-treated gas containing the carbon dioxide with use of a carbon dioxide adsorbent and regenerating the adsorbent after the adsorbent has adsorbed the carbon dioxide, the carbon dioxide separation and recovery system comprising:
an adsorption reactor that adsorbs, by the adsorbent, carbon dioxide contained in the to-be-treated gas and discharges the to-be-treated gas from which the carbon dioxide has been removed;
a desorption reactor that condenses desorbing steam on the adsorbent that has adsorbed the carbon dioxide to cause the carbon dioxide to desorb from the adsorbent;
an adsorbent dryer that causes, with use of a drying gas, condensation water contained in the adsorbent from which the carbon dioxide has desorbed to evaporate as steam until a water content ratio of the adsorbent becomes a predetermined value greater than or equal to a water content ratio limit, and discharges the adsorbent whose water content ratio has become the predetermined value; and a transfer unit that transfers the adsorbent discharged from the adsorbent dryer to the adsorption reactor.

2. The carbon dioxide separation and recovery system according to claim 1, further comprising:
a to-be-treated gas feeding unit that feeds the to-be-treated gas to the adsorption reactor;
a steam feeder that feeds the desorbing steam to the desorption reactor;
a carbon dioxide recovery unit that recovers carbon dioxide that has desorbed from the adsorbent in the desorption reactor; and
a drying gas feeder that feeds the drying gas to the adsorbent dryer.

3. The carbon dioxide separation and recovery system according to claim 1, further comprising:
a thermometer that detects a temperature of the adsorbent in the adsorbent dryer; and
an adsorbent dryer controller configured to adjust at least one of a feeding flow rate of the drying gas, a temperature of the drying gas, and a retention time of the adsorbent in the adsorbent dryer, such that the temperature detected by the thermometer is a temperature corresponding to the water content ratio limit of the adsorbent.

4. The carbon dioxide separation and recovery system according to claim 1,
further comprising:
a thermometer that detects a temperature of the adsorbent near an outlet of the adsorbent dryer; and
an adsorbent dryer controller configured to adjust at least one of a feeding flow rate of the drying gas, a temperature of the drying gas, and a retention time of the adsorbent in the adsorbent dryer, such that the temperature detected by the thermometer is a temperature corresponding to the water content ratio limit of the adsorbent.

5. The carbon dioxide separation and recovery system according to claim 1, further comprising:
a water amount meter that detects an amount of water in an exhaust gas discharged from the adsorbent dryer; and
an adsorbent dryer controller configured to adjust at least one of a feeding flow rate of the drying gas, a temperature of the drying gas, and a retention time of the adsorbent in the adsorbent dryer, such that the amount of water detected by the water amount meter is an amount of water in the desorbing steam that is fed to the desorption reactor.

6. The carbon dioxide separation and recovery system according to claim 1, further comprising:
a water content ratio meter that detects the water content ratio of the adsorbent in the adsorbent dryer; and
an adsorbent dryer controller configured to adjust at least one of a feeding flow rate of the drying gas, a temperature of the drying gas, and a retention time of the adsorbent in the adsorbent dryer, such that the water content ratio detected by the water content ratio meter is the predetermined value greater than or equal to the water content ratio limit.

7. The carbon dioxide separation and recovery system according to claim 1, further comprising:
a water content ratio meter that detects the water content ratio of the adsorbent near an outlet of the adsorbent dryer; and
an adsorbent dryer controller configured to adjust at least one of a feeding flow rate of the drying gas, a temperature of the drying gas, and a retention time of the adsorbent in the adsorbent dryer, such that the water content ratio detected by the water content ratio meter is the predetermined value greater than or equal to the water content ratio limit.

8. The carbon dioxide separation and recovery system according to claim 1, wherein the drying gas is the to-be-treated gas that has not been fed to the adsorption reactor.

9. The carbon dioxide separation and recovery system according to claim 8, further comprising a to-be-treated gas passage, through which the to-be-treated gas discharged from the adsorbent dryer is fed to the adsorption reactor.

10. The carbon dioxide separation and recovery system according to claim 1, wherein
the adsorption reactor and the adsorbent dryer are integrated together as a single chamber in which the adsorbent discharged from the desorption reactor and the to-be-treated gas form a moving bed, and
the carbon dioxide separation and recovery system further comprising a transfer unit that transfers the adsorbent discharged from the desorption reactor to the chamber.

11. A carbon dioxide separation and recovery method comprising:
adsorbing in an adsorption reactor, by a carbon dioxide adsorbent, carbon dioxide in a to-be-treated gas containing the carbon dioxide;
desorbing the carbon dioxide from the adsorbent by bringing the adsorbent into contact with desorbing steam to condense the desorbing steam on the adsorbent;
bringing a drying gas into contact with the adsorbent to cause condensation water contained in the adsorbent to evaporate as steam until a water content ratio of the adsorbent becomes a predetermined value greater than or equal to a water content ratio limit;
discharging the adsorbent whose water content ratio has become the predetermined value; and
transferring the discharged adsorbent to the adsorption reactor.

12. The carbon dioxide separation and recovery method according to claim 11, wherein drying the adsorbent includes drying the adsorbent until a temperature of the adsorbent becomes a temperature corresponding to the water content ratio limit of the adsorbent.

13. The carbon dioxide separation and recovery method according to claim 11, wherein drying the adsorbent includes drying the adsorbent until an amount of water that has evaporated from the adsorbent becomes an amount of water contained in the desorbing steam condensed on the adsorbent.

14. A carbon dioxide separation and recovery system for separating carbon dioxide from a to-be-treated gas containing the carbon dioxide with use of a carbon dioxide adsorbent and regenerating the adsorbent after the adsorbent has adsorbed the carbon dioxide, the carbon dioxide separation and recovery system comprising:
- an adsorption reactor that adsorbs, by the adsorbent, carbon dioxide contained in the to-be-treated gas and discharges the to-be-treated gas from which the carbon dioxide has been removed;
- a desorption reactor that condenses desorbing steam on the adsorbent that has adsorbed the carbon dioxide to cause the carbon dioxide to desorb from the adsorbent;
- an adsorbent dryer that (i) brings a drying gas into contact with the adsorbent from which the carbon dioxide has desorbed to dry the adsorbent over a period in which a temperature of the adsorbent decreases and then becomes substantially constant, the period ending before the temperature of the adsorbent starts increasing, (ii) causes, with use of a drying gas, condensation water contained in the adsorbent from which the carbon dioxide has desorbed to evaporate as steam until a water content ratio of the adsorbent becomes a predetermined value greater than or equal to a water content ratio limit, and (iii) discharges the dried adsorbent; and
- a transfer unit that transfers the adsorbent discharged from the adsorbent dryer to the adsorption reactor.

15. The carbon dioxide separation and recovery system according to claim 14, further comprising:
- a to-be-treated gas feeding unit that feeds the to-be-treated gas to the adsorption reactor;
- a steam feeder that feeds the desorbing steam to the desorption reactor;
- a carbon dioxide recovery unit that recovers carbon dioxide that has desorbed from the adsorbent in the desorption reactor; and
- a drying gas feeder that feeds the drying gas to the adsorbent dryer.

16. A carbon dioxide separation and recovery method comprising:
- adsorbing in an adsorption reactor, by a carbon dioxide adsorbent, carbon dioxide in a to-be-treated gas containing the carbon dioxide;
- desorbing the carbon dioxide from the adsorbent by bringing the adsorbent into contact with desorbing steam to condense the desorbing steam on the adsorbent;
- bringing a drying gas into contact with the adsorbent from which the carbon dioxide has desorbed to (i) dry the adsorbent over a period in which a temperature of the adsorbent decreases and then becomes substantially constant, the period ending before the temperature of the adsorbent starts increasing, and (ii) cause condensation water contained in the adsorbent to evaporate as steam until a water content ratio of the adsorbent becomes a predetermined value greater than or equal to a water content ratio limit;
- discharging the dried adsorbent; and
- transferring the discharged adsorbent to the adsorption reactor.

17. The carbon dioxide separation and recovery system according to claim 1, wherein a temperature of the adsorbent when the adsorbent is fed to the adsorption reactor is a predetermined adsorption temperature, and
- a wet-bulb temperature of the drying gas is the predetermined adsorption temperature.

18. The carbon dioxide separation and recovery system according to claim 11, wherein a temperature of the adsorbent when the adsorbent is fed to the adsorption reactor is a predetermined adsorption temperature, and
- a wet-bulb temperature of the drying gas is the predetermined adsorption temperature.

19. The carbon dioxide separation and recovery system according to claim 14, wherein a temperature of the adsorbent when the adsorbent is fed to the adsorption reactor is a predetermined adsorption temperature, and
- a wet-bulb temperature of the drying gas is the predetermined adsorption temperature.

20. The carbon dioxide separation and recovery system according to claim 16, wherein a temperature of the adsorbent when the adsorbent is fed to the adsorption reactor is a predetermined adsorption temperature, and
- a wet-bulb temperature of the drying gas is the predetermined adsorption temperature.

* * * * *